H. FELLOWS.
Track Clearer for Harvesters.
No. 112,575.
Patented March 14, 1871.
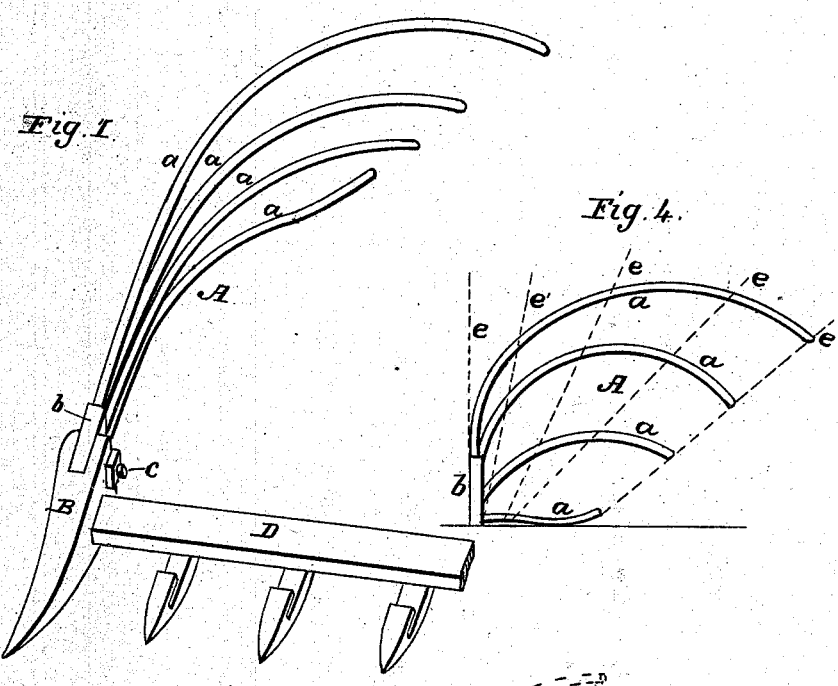
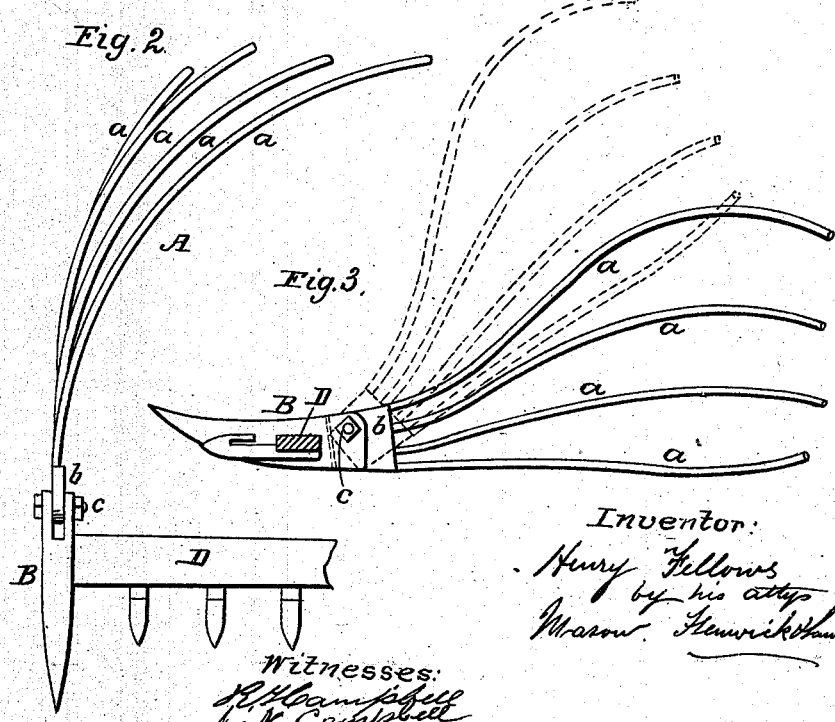

UNITED STATES PATENT OFFICE.

HENRY FELLOWS, OF BLOOMINGTON, INDIANA.

IMPROVEMENT IN TRACK-CLEARERS.

Specification forming part of Letters Patent No. 112,575, dated March 14, 1871.

*To all whom it may concern:*

Be it known that I, HENRY FELLOWS, of Bloomington, in the county of Monroe and State of Indiana, have invented a new and useful Improvement in Harvesting-Machines; and I do hereby declare that the following is a full, clear, and exact description thereof, reference being had to the accompanying drawing, making a part of this specification, in which—

Figure 1 is a perspective view of portion of the finger-bar of a mowing-machine, showing my improvement applied to it. Fig. 2 is a top view of the same. Fig. 3 is a side view looking from the inside. Fig. 4 is a detail.

Similar letters of reference indicate corresponding parts in the several figures.

The nature of my invention consists in a series of rods with their front ends directly over one another, and their rear extended portions, as they run back, turned spirally inward toward the draft-frame in such a manner that they, in the aggregate, form essentially a skeleton mold-board similar in principle to that of a turning-plow, these rods being so arranged that the lowermost one of the series runs directly on the ground.

The object sought by giving the track-clearer the form of a mold-board is to have it turn the cut grass in so effectual a manner as to leave a clear track or path next the standing grass, and thereby prevent choking of the machine at the point where the finger-bar joins the draft-frame when the machine makes its next round.

Heretofore all attempts toward accomplishing this object in mowing-machines with track-clearers have failed, for the simple reason that the rods have either been simply bent around toward the draft-frame, and one set a little in advance of another, without any regard being had to so arranging them that they shall set in a line corresponding to the profile of the mold-board of a turning-plow, to arrive at this arrangement and have it effective it being necessary to both turn the rods inward and give them a spiral wind, and also to have the rods of a gradually-increased length.

I am aware that harvesting-machines have hitherto been provided with track-clearers; but I believe in every instance they have failed to perform the work required of them effectually, owing in part to the improper shape given to them.

To enable others skilled in the art to understand my invention, I will describe its construction and operation.

In the accompanying drawing, A represents a skeleton frame, which is made up of rods $a$, of metal or wood, of a round or other shape, and of any suitable length. These rods are inserted permanently into the rear edge of a toe-piece, $b$, which piece is connected to the heel of the outer divider, B, of a finger-bar, D, by means of a transverse pivot $c$. This pivotal attachment of the skeleton frame A will allow it to vibrate freely and to conform to inequalities of surface passed over.

The lowermost rod $a$ is curved and twisted spirally inwardly, and slightly turned upward at its rear end, as shown in Figs. 3 and 4. The succeeding rod $a$ above is somewhat longer than the preceding, and is curved and twisted spirally, so as to overhang it inward. The next rod above and the highest and last one are also curved in a corresponding manner to the lower ones, besides which they are curved downwardly near their rear termination, as shown in Figs. 3 and 4.

It will be seen, by reference to Figs. 2 and 4, that the four rods at and near points of union with the toe-piece are arranged one over the other in the same plane, diverging inwardly from this plane as they extend backward from the said toe-piece.

The rods forming the mold-board or frame A are disconnected except by means of toe-piece $b$, and consequently they have a free springing action while turning over the cut product. These rods $a$ should be arranged so near one another that the cut product will not pass between them.

It will be seen from the above description that I have combined with the cutting apparatus a light skeleton frame, which is constructed in form like the mold-board of a turning-plow, which frame or mold-board will not only press the cut product inwardly, so as to leave a clean track next that which is standing, but it will also turn over the cut product, so that it will not fall back again into the track.

In practice, when the piece $b$ is made of metal, the rods will be set in a mold, and the metal for the piece *b* cast around their front ends.

I do not confine myself to any particular number of rods, designing, however, to always use enough to form a mold-board track-clearer which is high enough to prevent high grass from falling over it, and has its rods close enough together to prevent leaning or low grass from pitching through between them.

I do not claim bent parting-rods applied to reaping-machines, nor do I claim rods which are simply bent inward and arranged along their whole length directly over one another in mowing-machines; neither do I claim a plate which is pointed and of mold-board form, and has rods extending back from it, as in the patent of Davis, dated April 24, 1866; nor do I claim a forked plate of concave spiral form, as shown in M. G. Hubbard's patent, dated February 9, 1858; nor do I claim merely shaping the upper swath-stick of a grass-divider in the manner shown in the patent granted to Spicer December 7, 1869.

What I do claim as my invention, and desire to secure by Letters Patent, is—

A hinged track-clearer constructed in the form described, consisting of a series of rods which have their front ends rigidly attached to a hinged block, and as they extend backward expand and curve inwardly and spirally, so as to present, when taken together, a form similar to that of the mold-board of a turning-plow, all as set forth.

HENRY FELLOWS.

Witnesses:
ALEX. LUZADDER,
J. M. HEREN.